(12) United States Patent
Cleary

(10) Patent No.: US 9,512,808 B2
(45) Date of Patent: Dec. 6, 2016

(54) METHOD FOR IMPROVING ENGINE PERFORMANCE USING A TEMPERATURE MANAGED FUEL SYSTEM

(75) Inventor: David J. Cleary, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 842 days.

(21) Appl. No.: 13/805,425

(22) PCT Filed: Jun. 25, 2010

(86) PCT No.: PCT/CN2010/000946
§ 371 (c)(1),
(2), (4) Date: Mar. 20, 2013

(87) PCT Pub. No.: WO2011/160260
PCT Pub. Date: Dec. 29, 2011

(65) Prior Publication Data
US 2013/0174815 A1 Jul. 11, 2013

(51) Int. Cl.
*F02G 5/00* (2006.01)
*F02M 31/04* (2006.01)
*F02D 41/38* (2006.01)
*F02M 31/20* (2006.01)
*F02M 53/02* (2006.01)
(Continued)

(52) U.S. Cl.
CPC .......... *F02M 31/04* (2013.01); *F02D 41/3836* (2013.01); *F02M 31/20* (2013.01); *F02M 53/02* (2013.01); *F02D 19/0628* (2013.01); *F02D 19/0644* (2013.01); *F02D 19/084* (2013.01); *F02D 2200/0606* (2013.01); *Y02T 10/126* (2013.01); *Y02T 10/36* (2013.01)

(58) Field of Classification Search
CPC ........ F02M 31/08; F02M 31/14; F02M 31/16; F02M 69/386; F02M 2700/4342; F02M 2700/4345; F02M 2700/4347; F02M 2700/4352; F02M 2700/4354; F02M 2700/4357; F02D 2200/06; F02D 2200/0606; F02D 2200/0608; F02D 19/022; F02D 19/024; F02D 19/026; F02D 19/027; F02D 19/028; F02D 19/0602; F02D 19/0605; F02D 19/0626; F02D 19/0628; F02D 19/0631; F02D 41/3836; F02D 41/40; F02D 41/402; F02D 41/403; F02D 41/405
USPC ................. 123/543, 553, 557, 558
See application file for complete search history.

(56) References Cited

U.S. PATENT DOCUMENTS 4,372,278 A * 2/1983 Smith ..................... F02D 35/00
123/478
5,558,069 A 9/1996 Stay
(Continued)

FOREIGN PATENT DOCUMENTS

DE 19826866 A1 12/1999
WO WO 2006/005930 A2 1/2006

*Primary Examiner* — Hung Q Nguyen

(57) ABSTRACT

A method to operate an internal combustion engine having a fuel delivery system and a heat exchanger located to affect a fuel temperature within the fuel delivery system includes monitoring a desired heat transfer between a flow through the heat exchanger and fuel within the fuel delivery system, determining a required flow through the heat exchanger based upon the desired heat transfer, and controlling a flow control device for the heat exchanger based upon the determined required flow.

25 Claims, 5 Drawing Sheets

(51) Int. Cl.
*F02D 19/06* (2006.01)
*F02D 19/08* (2006.01)

(56) References Cited

U.S. PATENT DOCUMENTS

| | | | | |
|---|---|---|---|---|
| 5,778,861 | A * | 7/1998 | Diduck | F02M 31/16 |
| | | | | 123/557 |
| 7,017,547 | B2 * | 3/2006 | Mehta | F02M 53/02 |
| | | | | 123/305 |
| 2001/0025631 | A1 | 10/2001 | Beekman et al. | |
| 2009/0025908 | A1 * | 1/2009 | Samanta | F02M 31/14 |
| | | | | 165/104.19 |

* cited by examiner

METHOD FOR IMPROVING ENGINE PERFORMANCE USING A TEMPERATURE MANAGED FUEL SYSTEM

CROSS-REFERENCE TO RELATED APPLICATIONS

This application claims the benefit of International Application No. PCT/CN2010/000946, filed Jun. 25, 2010, which is hereby incorporated by reference in its entirety.

TECHNICAL FIELD

This disclosure is related to internal combustion engines.

BACKGROUND

The statements in this section merely provide background information related to the present disclosure and may not constitute prior art.

Internal combustion engines utilize valve timing strategies to effect changes to engine operation and performance Valve opening and closing timings influence the thermodynamic cycle and the combustion process, including fuel efficiency, emissions, and engine torque level.

A number of advanced combustion strategies are known, including homogeneous-charge spark ignition, homogeneous combustion compression ignition (HCCI), stratified charge spark ignition, and stratified-charge compression ignition. Such strategies are designed to improve the efficiency and emissions of the internal combustion engine, through a combination of reduced pumping work, reduced heat losses, an improved combustion process, and improved thermodynamics.

Heat exchangers are devices that utilize a gas or liquid to change the temperature and of a gas or liquid. Heat exchangers include structures that maximize surface area within the heat exchanger, and as the two flows pass through the heat exchanger and come into contact with the surface area within the heat exchanger, heat flows from the higher temperature flow to the lower temperature flow.

Engines utilize engine coolant to cool the engine block. Cooler engine coolant enters the engine block, picks up heat from the engine, and exits the engine as a higher temperature, heated engine coolant. Engine coolant is additionally used for auxiliary purposes in the engine, for example, providing heated engine coolant to a passenger compartment heater device and providing supply engine coolant to an exhaust gas recirculation (EGR) cooler device to cool an EGR flow.

Charged engines utilize a compressor device such as a supercharger or a turbocharger to create forced induction of intake air into the engine. Charging intake air by compressing the intake air additionally heats the intake air. As a result of the heating, the performance of the engine throughout a higher-load region may become increasingly limited due to knock. Charged engine configurations may utilize an intercooler device to cool the compressed intake air in order to improve the knock performance of the engine. Intercooler devices may include a gas to liquid heat exchanger, wherein cooler, supply intercooler fluid or intercooler coolant is passed through the heat exchanger, picks up heat from the compressed intake air, and exits the intercooler device as a higher temperature, heated intercooler fluid.

A direct injection engine includes a fuel injector spraying fuel into a combustion chamber. Fuel may be delivered to the injector or injectors by a fuel system including a fuel rail or fuel rails. A fuel rail is a pipe-like device including an inlet and outlets leading to each of the injectors fed by the fuel rail.

Fuel properties affect the resulting combustion process. A spray pattern resulting in the combustion chamber may affect a number of parameters, including volumetric efficiency, a degree of air-fuel mixing, combustion phasing, knock, pre-ignition, and whether fuel is sprayed upon the walls of the combustion chamber.

SUMMARY

A method to operate an internal combustion engine having a fuel delivery system and a heat exchanger located to affect a fuel temperature within the fuel delivery system includes monitoring a desired heat transfer between a flow through the heat exchanger and fuel within the fuel delivery system, determining a required flow through the heat exchanger based upon the desired heat transfer, and controlling a flow control device for the heat exchanger based upon the determined required flow.

BRIEF DESCRIPTION OF THE DRAWINGS

One or more embodiments will now be described, by way of example, with reference to the accompanying drawings, in which.

DETAILED DESCRIPTION

Figure 1:
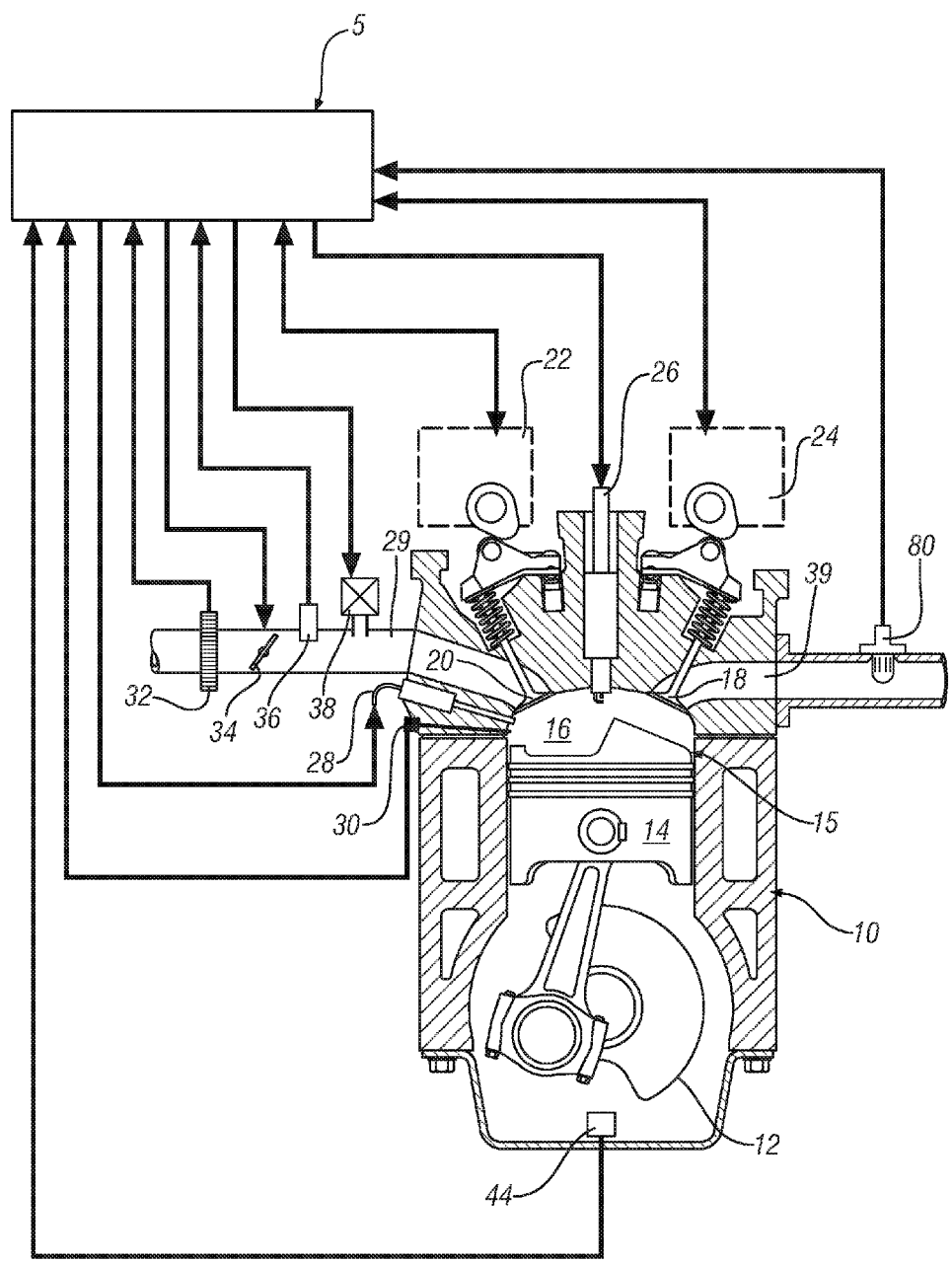
FIG. 1 depicts an exemplary schematic of an internal combustion engine and control module, in accordance with the present disclosure.

Referring now to the drawings, wherein the showings are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, a stratified-charge spark-ignition combustion mode, or a stratified-charge compression ignition mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an EGR valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (VLC) devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap may be commanded to generate reformates in the combustion chamber 16. There may be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 may be controlled. VCP systems may have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap may be measured in crank angle degrees, wherein a positive valve overlap (PVO) refers to a period wherein both the exhaust valve 18 and the intake valve 20 are open and a negative valve overlap (NVO) refers to a period between closing of the exhaust valve 18 and subsequent opening of the intake valve 20 wherein both the intake valve 20 and the exhaust valve 18 are closed. When operating in the HCCI combustion mode, the intake and exhaust valves may have a NVO as part of an exhaust recompression strategy. In a SI-homogeneous combustion mode the intake and exhaust valves may have a NVO, but more typically will have a PVO.

The engine 10 includes a fuel injection system, comprising a plurality of high-pressure fuel injectors 28 each adapted to directly inject a mass of fuel into one of the combustion chambers 16, in response to a signal (INJ_PW) from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5. The spark plug 26 may enhance the ignition process of the engine at certain conditions such as for the HCCI combustion mode (e.g., during cold engine conditions and near a low load operation limit).

The engine 10 is equipped with various sensing devices for monitoring engine operation, including monitoring crankshaft rotational position, i.e., crank angle and speed. Sensing devices include a crankshaft rotational speed sensor (crank sensor) 44, a combustion sensor 30 adapted to monitor combustion and an exhaust gas sensor 80 adapted to monitor exhaust gases, for example using an air/fuel ratio sensor. The combustion sensor 30 comprises a sensor device operative to monitor a state of a combustion parameter and is depicted as a cylinder pressure sensor operative to monitor in-cylinder combustion pressure. The outputs of the combustion sensor 30, the exhaust gas sensor 80 and the crank sensor 44 are monitored by the control module 5 which determines combustion phasing, i.e., timing of combustion pressure relative to the crank angle of the crankshaft 12 for each cylinder 15 for each combustion cycle. The combustion sensor 30 may also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing may include predetermined valve overlap, including NVO and low lift of the intake and exhaust valves 20 and 18 in an exhaust re-breathing strategy. The control module 5 is adapted to receive input signals from an operator, e.g., from a throttle pedal position and a brake pedal position, to determine an operator torque request, and from the sensors indicating the engine speed, intake air temperature, coolant temperature, and other ambient conditions.

The control module 5 is an element of an overall vehicle control system, preferably comprising a distributed control module architecture operable to provide coordinated system control. The control module 5 is operable to synthesize pertinent information and inputs from the aforementioned sensing devices, and execute algorithms to control various actuators to achieve control of fuel economy, emissions, performance, drivability, and protection of hardware, as described hereinbelow.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
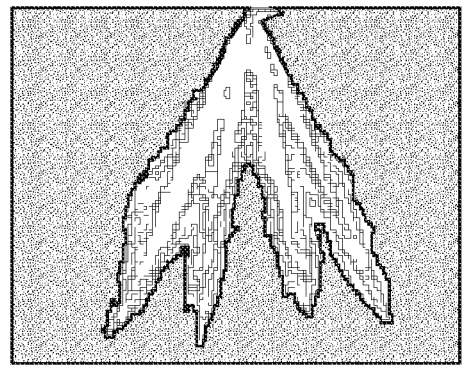
FIGS. 2-4 depict exemplary spray patterns resulting from three different fuel temperatures, in accordance with the present disclosure.
Figure 3:
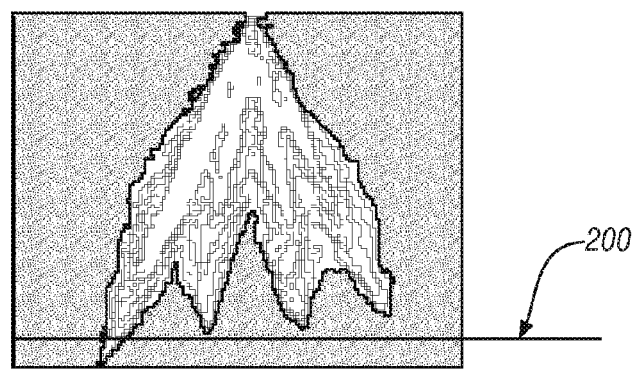
Figure 4:
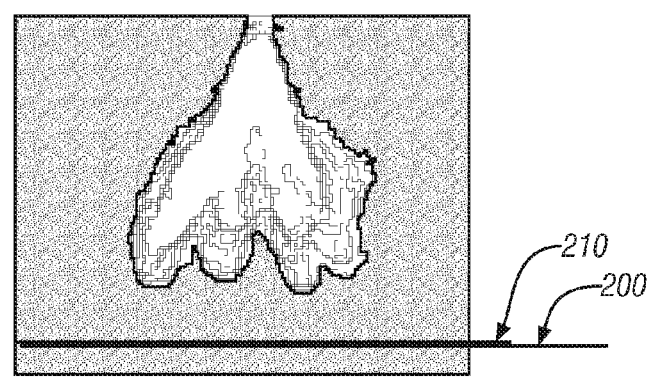

Fuel temperature has an impact on combustion performance. For example, fuel temperature affects a spray pattern and quality resulting within a combustion chamber. FIGS. 2-4 depict exemplary spray patterns resulting from three different fuel temperatures, in accordance with the present disclosure. Depicted spray patterns are shown for an ambient pressure of 100 kPa. FIG. 2 depicts a cross section of an exemplary spray pattern resulting at 20 degrees Celsius. The spray pattern may be described as a narrow and penetrating pattern, wherein fuel is directed in a jet rather than being dispersed in a cloud. FIG. 3 depicts a cross section of an exemplary spray pattern resulting at 60 degrees Celsius.

Line 200 is depicted, illustrating the average penetration of the spray depicted in FIG. 2. The spray pattern resulting in FIG. 3 may be described as not as narrow and not as penetrating as the pattern of FIG. 2. FIG. 4 depicts a cross section of an exemplary spray pattern resulting at 90 degrees Celsius. Line 200 is again depicted. Line 210 is depicted, illustrating the average penetration of the spray depicted in FIG. 3. The spray pattern of FIG. 4 may be described as a more dispersed, cloud-like pattern than the other two patterns. Each of the patterns depicted in FIGS. 2-4 have different implications to the resulting combustion.

Fuel within a fuel rail during exemplary low load and low speed operation may substantially achieve the engine compartment temperature based upon the fuel dwelling in the fuel delivery system for a period of time and accumulating heat from the engine compartment. However, at higher loads, exemplary fuel temperatures may drop based upon the fuel moving through the fuel delivery system more quickly, spending less dwell time in the engine compartment. Under such high load conditions, exemplary fuel temperatures may be calculated to be between 40 degrees Celsius and 60 degrees Celsius for a naturally aspirated engine and may be expected to be lower for a charged engine. In accordance with the present disclosure, a heat exchanger is employed to effect changes in temperature to a fuel flow.

Engine coolant is utilized in an engine to remove heat from the engine block. Engine coolant is circulated in an engine cooling system, and the temperature of the engine coolant before the engine coolant is used to cool the engine or as a flow of supply engine coolant during substantially steady state operation of an engine is typically between 85 and 90 degrees Celsius. Heated engine coolant, or coolant that has been used to cool the engine and has not yet been cooled in a radiator device, is warmed to a temperature above the temperature of the supply engine coolant. A method to control a temperature of a fuel flow includes utilizing engine coolant, either supply engine coolant or heated engine coolant, to transfer heat to the fuel flow. Additionally or alternatively, heat may be transferred from other flows in the engine to the fuel flow.

FIG. 1 depicts an exemplary configuration of engine 10 including a naturally aspirated engine, wherein intake air is drawn into the engine from an ambient pressure environment. Exemplary methods to provide boost air to the engine include turbocharging, wherein a turbine in the exhaust system is utilized to drive a compressor in the intake system; twin turbocharging, wherein multiple turbochargers are utilized; supercharging, wherein a belt driven device includes a compressor in the intake system; and a combination of turbocharging and supercharging, wherein both are utilized to cooperatively provide boost air in the intake system.

Figure 5:
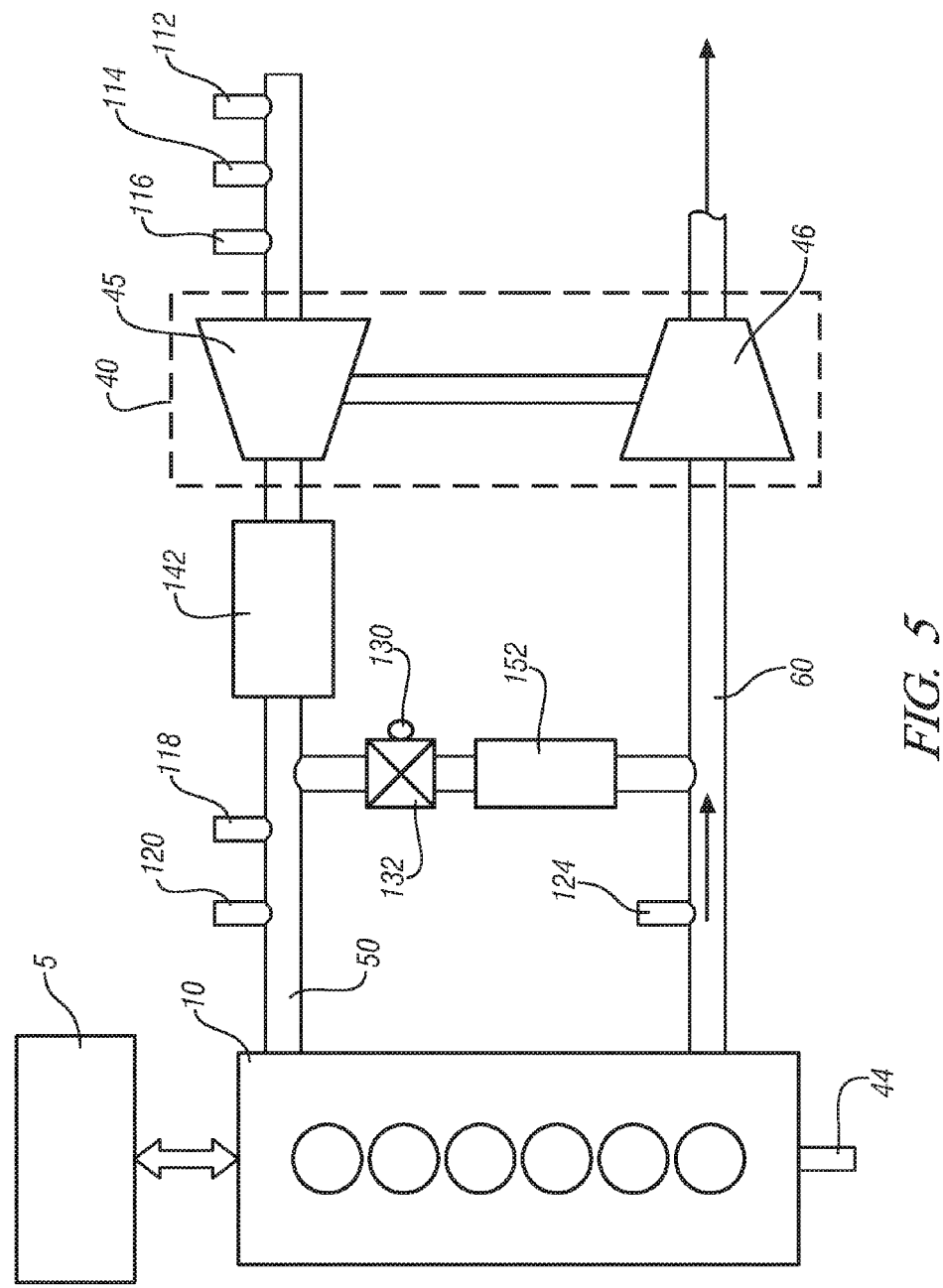
FIG. 5 schematically depicts an exemplary engine configuration including a turbocharger, in accordance with the present disclosure.

FIG. 5 schematically depicts an exemplary engine configuration including a turbocharger, in accordance with the present disclosure. The exemplary engine 10 includes a conventional multi-cylinder internal combustion engine 10, as described above. Engine 10 may include a variety of fueling types and combustion strategies known in the art. Engine system components include an intake air compressing device 40 including a turbine device 46 and an air compressor device 45, a charge air cooler 142, an EGR valve 132 and cooler 152, an intake manifold 50, and exhaust manifold 60. Sensing devices are installed on the engine to monitor physical characteristics and generate signals which are correlatable to engine and ambient parameters. The sensing devices preferably include an ambient air pressure sensor 112, an ambient or intake air temperature sensor 114, and a mass air flow sensor 116, all which may be configured individually or as a single integrated device; an intake manifold air temperature sensor 118, and MAP sensor 120. There is an exhaust gas temperature sensor 124 and an EGR valve position sensor 130. Engine speed sensor 44 monitors rotational speed of the engine. Each of the sensing devices is signally connected to the control module 5 to provide signal information which is transformed by the control module 5 to information representative of the respective monitored parameter. It is understood that this configuration is illustrative, not restrictive, including the various sensing devices being replaceable within functionally equivalent devices and algorithms and still fall within the scope of the invention. Furthermore, the intake air compressing device 40 may include alternative turbocharger configurations within the scope of this disclosure.

The embodiment of FIG. 5 depicts an exemplary configuration including a high-pressure EGR system, wherein flow through EGR valve 132 and cooler 152 is taken from the exhaust system before the turbine 46 and the EGR flow enters the intake system after the compressor 45. It will be appreciated that in different configurations, a low-pressure EGR system may be utilized, wherein the EGR flow is taken from the exhaust system after the turbine 46 and enters the intake system before the compressor 45.

The intake air compressing device 40 includes a turbocharger device consisting of an air compressor device 45 positioned in the air intake of the engine which is driven by turbine device 46 that is positioned in the exhaust gas flowstream. Turbochargers are devices known in the art to create forced induction of air into an engine to increase the output of the engine. Turbine device 46 may include a number of embodiments, including a device with fixed vane orientations or variable vane orientations.

FIG. 5 above describes use of a turbocharger to supply compressed intake air or a boost pressure to the engine. Other devices or configurations may be used to supply compressed intake air to the engine. For example, a twin-turbocharger configuration may be utilized, including a plurality of turbocharger devices supplying compressed intake air. Alternatively, a supercharger device may be utilized, operating a compressor to supply compressed intake air to the engine and receiving power to the compressor through a serpentine or auxiliary device belt driven by the engine.

Regardless of the method by which compressed air is generated, such configurations utilize an intercooler device with intercooler fluid. An intercooler fluid circuit includes a supply intercooler fluid flow that is utilized to cool the compressed intake air, creating a heated intercooler fluid flow. The intercooler fluid is then cooled by a radiator device and returns to the supply intercooler fluid flow. The heated intercooler fluid flow may be utilized to heat the fuel flow according to the present disclosure. Additionally, the supply intercooler flow is typically sustained at a lower temperature than the steady state temperature of the engine and may be utilized under certain circumstances to cool the fuel within the fuel delivery system.

In addition to the coolant or fluid flows described above, an engine generates a high temperature exhaust gas flow. Such an exhaust gas flow or a portion thereof may be channeled through a heat exchanger in order to heat fuel within a fuel delivery system. In a method similar to the methods above including a coolant flow, heat from the exhaust gas flow may be selectively transferred through the heat exchanger to the fuel in the fuel delivery system, such as fuel within a fuel rail. Selective transfer of the heat from the exhaust gas flow may be controlled by a control valve, for example, similar to an EGR valve utilized to control exhaust gas flow through EGR circuits. Use of exhaust to transfer heat to fuel includes a benefit that exhaust gas is hot even when the engine has just been started, whereas the coolant flows described above may take time after an initial startup to heat up. Exhaust gas may be utilized in a gas to liquid heat exchanger to directly heat the fuel flow. However, exhaust gas may vary greatly in temperature. An additional method to heat the fuel flow includes utilizing an exhaust gas flow to heat an intermediary liquid, such as a circuit of engine coolant, and utilize the intermediary liquid to heat the fuel flow.

Different coolant flows or exhaust gas flow utilized to heat the fuel include different temperature ranges for the coolants or the exhaust gas flow. For example, supply engine coolant is typically close to the 85 to 90 degree range sought for the fuel flow. An exhaust gas flow, on the other hand, may be much hotter. Further, temperature of the exhaust gas flow may change greatly depending upon engine output. Temperature of the exhaust gas at idle may be significantly lower than temperature of the exhaust gas with the engine at high load. Similarly, temperature of the heated intercooler fluid may change depending upon a level of boost being provided by the turbocharger. In periods of low load when little or no boost is being provided, the temperature of the heated intercooler fluid may be much lower than under high load and high speed conditions. Depending upon the flow utilized to provide heat to the fuel flow, it may be desirable to provide a controlled amount of heat to the fuel, for example, modifying a duty cycle of the flow providing heat to the fuel flow.

The above described heat exchanger is preferably located proximate to the fuel flow in order to effectively transfer heat to the fuel flow. However, the precise design of the heat exchanger and the associated fuel delivery system may take a number of embodiments. In one exemplary embodiment, a single fuel rail/heat exchanger device may be utilized, wherein a single unitary device includes a passage for fuel to flow through and a passage for the coolant or exhaust gas to flow through. In another exemplary embodiment, a fuel rail may be one device, and the heat exchanger may be a separate device which may be placed in direct contact with or jacketed or wrapped around the fuel rail. As described above, a fuel rail is a portion of a fuel delivery system. The heat exchanger may be utilized upstream of the fuel rail, for example, utilized in a liquid to liquid heat exchanger separate from the fuel rail in association with a fuel line leading to the fuel rail. A fuel rail typically delivers fuel directly to a fuel injector, however, in designs wherein an intermediary fuel line is used between a fuel rail and an injector or in designs omitting a fuel rail, a heat exchanger or heat exchangers may be utilized similarly on whatever fuel lines deliver the fuel to the injectors.

It will be appreciated that different heat exchanger designs may be utilized. For example, different materials may be utilized depending upon the temperatures and corrosive agents that the heat exchanger will be exposed to. Additionally, different flow patterns may be utilized within the heat exchangers, for example, with the fuel flow and the other flow flowing in the same direction or flowing in opposite directions.

The naturally aspirated, direct injection engine 10 of FIG. 1 may include a number of combustion modes, including operation under homogeneous-charge spark ignition (HCSI), HCCI, stratified charge, stratified-charge compression ignition, or PCCI strategies in exemplary diesel configurations. Similar combustion modes may be utilized in turbocharged engines. Different combustion modes and different operating ranges may be sensitive to different combustion parameters. The temperature of the fuel flow, as described above, affects the resulting spray pattern in the combustion chamber. Based upon the desired combustion performance and the effects of the different spray patterns, fuel temperature may be controlled to achieve the desired results.

In one exemplary embodiment, at higher engine loads, heating a fuel flow to achieve reduced spray penetration and better atomization or vaporization may be desirable. A degree of vaporization affects how well the liquid fuel transforms into a vapor fuel which affects the fuel distribution throughout the combustion chamber. Preignition or engine knock may be a problem at high engine loads. Fuel sprayed upon the hot walls of the combustion chamber or bore liner wetting may facilitate preignition of the charge. Further, operation at high load, with a corresponding high mass of fuel injection, at low engine speed, with a corresponding low intake air flow, reduces mixing of the charge and results in lean and rich pockets within the combustion chamber that may result in deteriorated knock and preignition performance. A concentrated spray of fuel such as is exhibited at low temperatures makes the mixing at high load and low engine speed more difficult. Therefore, a spray pattern forming a cloud-like spray of fuel with reduced, diffused, or altered penetration may be useful at high loads to reduce the occurrence of preignition and knock. Additionally, reduced spray penetration and better atomization/vaporization of the injected fuel lowers emissions including soot and CO and improves combustion stability through improved air-fuel preparation/improved spray quality, especially under lower speed and higher load conditions. It will be appreciated that these improvements may all result in better fuel economy under certain engine operating conditions.

While improved higher-load performance is anticipated for a naturally aspirated engine, more significant benefits are expected for a charged engine. Charged engines tend to inject higher fuel mass, resulting in increased fuel flow rates through the fuel delivery system and correspondingly lower fuel temperatures. For example, a charged exemplary engine may include an injected fuel mass over 100 mg/event, more than double a naturally aspirated exemplary engine maximum fueling level. Further, knock is increasingly a problem as a charged engine is operated more often at higher loads. Charged engines may operate at significantly higher loads than naturally aspirated engines. For example, a naturally aspirated engine typically operates around 0.5 bar to 6 bar BMEP and reaches 10 to 12 bar BMEP at peak loads. A charged engine may reach peak loads of 35 bar BMEP. While naturally aspirated engines do exhibit knock, knock is a more substantial concern in charged engines. As a charged engine operates at much higher loads, a delayed combustion process may be required to reduce the occurrence of knock. Such a delayed combustion process may reduce the fuel efficiency of the engine. Improved fuel efficiency may be achieved by controlling temperature of the fuel flow to reduce the occurrence of knock instead of or reducing the delay of delaying the combustion process.

Better fuel economy is achieved when improving the combustion process at higher engine loads as well as when providing the opportunity for utilizing smaller charged engines. As described above, conditions may exist wherein high load and low engine speeds result in poor or limited charge mixing. As smaller engines are combined with charging devices in order to achieve higher fuel economy, correspondingly higher loads are demanded of the engines. Under conditions of limited mixing, a portion of the mixture within the combustion chamber becomes rich while another portion becomes lean. The rich portion of the mixture increases soot emissions while the lean portion of the mixture may result in increased knock. The methods described herein may improve mixing, thereby reducing occurrence of knock and soot generation; permitting operation of smaller charged engines at correspondingly greater loads while achieving better fuel economy.

Engine knock may be a limiting factor in utilizing higher geometric compression ratios in an engine. Under normal operation, when the temperature of the fuel flow may vary based upon factors such as engine load, lower fuel temperatures and the associated higher penetration of the resulting spray patterns may exacerbate knock in an engine with a high compression ratio. By controlling the spray pattern in an engine to eliminate the penetrating spray pattern and reduce the occurrence of knock, a higher geometric compression ratio may be utilized.

Figure 6:
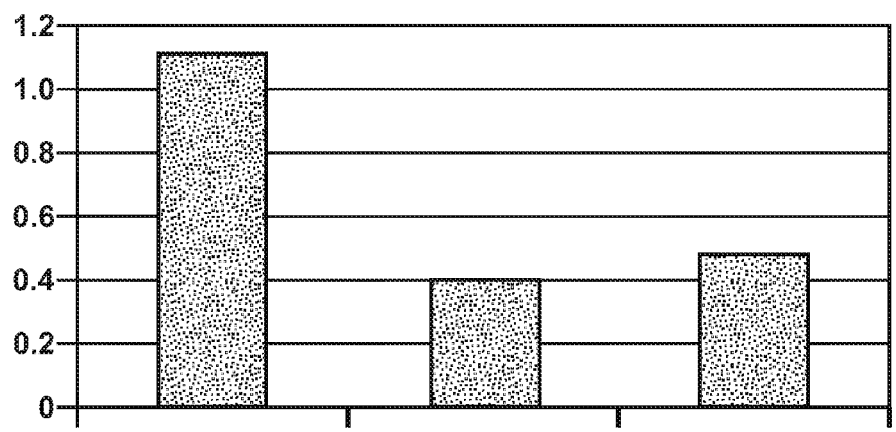
FIG. 6 depicts exemplary torque reductions evident for heated fuel, in accordance with the present disclosure.

The above embodiments describe benefits of heating a flow of fuel. However, there are conditions wherein a lower temperature fuel flow is beneficial. A small volumetric efficiency penalty or reduction in torque may be shown for higher fuel temperatures. FIG. 6 depicts exemplary torque reductions evident for heated fuel, in accordance with the present disclosure. Test conditions included measuring a reduction in torque measuring 90 degree Celsius fuel as opposed to a 50 degree Celsius fuel as a baseline. The first, left-most bar describes gasoline, the second bar describes ethanol, and the third, right-most bar describes methanol. Under certain conditions whereat in-cylinder air-fuel mixing and engine knock is not a concern, not heating the fuel or cooling warmer fuel may be beneficial to gain the described volumetric efficiency. Under certain exemplary conditions, the supply intercooler fluid described above may be substantially lower in temperature than the operating temperature of an engine. As a result, a flow of supply intercooler fluid through the heat exchanger may be utilized to lower the temperature of a fuel flow within the fuel rail.

Additionally, lowering temperature of fuel within a fuel rail may be beneficial during hot soak conditions. Hot soak conditions describe a tendency of the temperature in an engine compartment to increase for a hot soak period after the engine has been turned off. Fuel trapped within the fuel rail and injector tends to increase in temperature as the temperature of the engine compartment increases. If unaddressed, this rise in temperature of the fuel trapped within the fuel rail may cause the fuel to vaporize, resulting in limited ability to restart the engine. One method to prevent vaporization of the fuel within the fuel rail is to pressurize the fuel rail, thereby preventing a state transition of the fuel from liquid to gas. However, this high pressure fuel within the fuel rail may similarly escape through the injector into the combustion chamber. Such fuel vapor in the combustion chamber may cause increased emissions in the next engine restart and may increase formation of deposits. A method to prevent excessive heating of the fuel rail during a hot soak period includes utilizing coolant or fluid in a heat exchanger with or proximate to the fuel rail to reduce the heating effects of the hot soak upon the fuel in the fuel rail. According to one exemplary embodiment, by positioning a mass of engine coolant proximate to the fuel rail at the time of engine shut-down and maintaining that mass of engine coolant in place during the hot soak period, the thermal mass of the engine coolant combined with heat transfer between the engine coolant and the fuel in fuel rail may prevent an excessive temperature increase to the fuel within the fuel rail. Similarly, a pump may be utilized to circulate engine coolant through the heat exchanger during the hot soak period, thereby providing a flow of coolant to absorb heat through the heat exchanger and prevent an excessive temperature increase to the fuel within the fuel rail. In the alternative, as described above, intercooler fluid may be utilized to control temperature of fuel within the fuel rail. For example, during the hot soak period, a mass of intercooler fluid may be maintained proximate to the fuel rail or a flow of supply intercooler fluid may be circulated through the heat exchanger to prevent an excessive temperature increase to the fuel within the fuel rail.

One exemplary embodiment may use an exhaust gas flow to initially heat fuel during a warm-up period. Once the engine and an associated coolant flow reaches operating temperatures, a method may be employed to switch from the exhaust gas flow to the coolant for heating the fuel flow. Such an exemplary method, for example, may include parallel heat exchangers proximate to a fuel rail. In another embodiment, serial heat exchange devices may be utilized. In one exemplary embodiment, a three-way valve may be used to switch between an exhaust gas flow, a coolant flow, and no flow through the heat exchanger or heat exchangers based upon the engine temperature and a fuel heating requirement or command.

The above methods describe controlling temperature of fuel or a fuel flow based upon a controlling a flow through a corresponding heat exchanger. Flow through the heat exchanger may be controlled according to a desired heat transfer between the flow through the heat exchanger and the fuel flow. A desired heat transfer may be determined based upon a measured temperature of the fuel in the fuel delivery system and a desired or threshold temperature of the fuel. An exemplary threshold or desired fuel temperature may be selected to control the fuel flow to remain substantially between 92 and 98 degrees Celsius, based upon a desired spray pattern as described herein. Flow through the heat exchanger may then be controlled as a feedback or closed-loop control based upon the measured temperature of the fuel, with the desired heat transfer describing the resulting feedback control of the flow. Control based upon the measured temperature of the fuel may include a comparison of the measured temperature to a threshold temperature. In this way, a measured fuel temperature may be used to control flow to a heat exchanger heating the fuel.

Alternatively, a desired heat transfer may be determined based upon available data, for example, based upon an estimated state of the fuel in the fuel delivery system based upon monitored operation of the engine. The estimated state of the fuel may be expressed as a temperature of the fuel and a flow rate of the fuel. Based upon the estimated state of the fuel, the desired heat transfer to change the estimated state of the fuel to a desired state of the fuel, including controlling the temperature of the fuel according to methods described herein, may be determined as an open-loop control term. Based upon the desired heat transfer, control of the flow through the heat exchanger may be determined based upon an estimate of a state the flow available to the heat exchanger and factors affecting heat transfer through the heat exchanger. Control of the flow through the heat exchanger may be described as a required flow through the heat exchanger or a flow duty cycle. Estimating the state of the flow available to the heat exchanger for open loop control of the flow may take a number of embodiments. In one example, an engine coolant temperature available for the heat exchanger may be measured or modeled. In another example, operation of the engine cooling system of the engine may be modeled, for example, estimating resulting engine coolant temperatures and operation of a cooling fan. In another example, an intercooler temperature may be measured or modeled. In another example, operation of the intercooler circuit may be measured or modeled including a temperature of the intercooler fluid. In another example, exhaust gas temperatures may be measured or modeled including a temperature of the exhaust gas.

The above control methods are examples of how heat transfer between the flow through the heat exchanger and the fuel and the required flow through the heat exchanger may be controlled. A number of similar control methods are envisioned, and the disclosure is not intended to be limited to the particular exemplary embodiments described herein.

Figure 7:
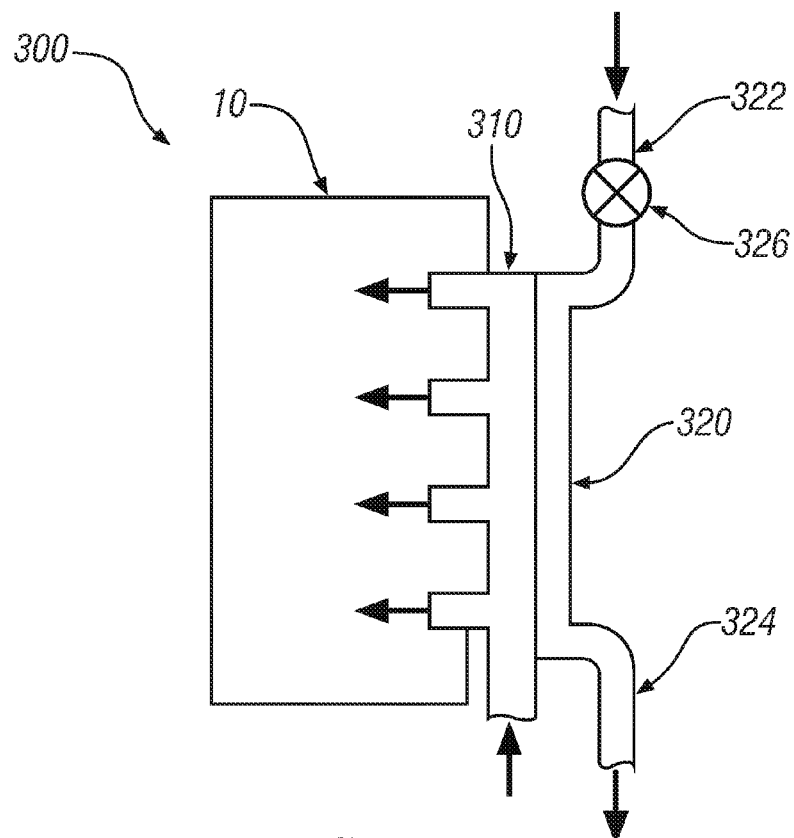
FIG. 7 depicts an exemplary engine including a fuel rail and a heat exchanger located to heat a fuel flow within the fuel rail, in accordance with the present disclosure.

FIG. 7 depicts an exemplary engine including a fuel rail and a heat exchanger located to heat a fuel flow within the fuel rail, in accordance with the present disclosure. Configuration 300 is depicted. Engine 10 is depicted including fuel rail 310 and heat exchanger 320. Fuel flows into the fuel rail 310 and out into four paths leading to four fuel injectors. Inlet 322 to heat exchanger 320 is depicted, including a flow control valve 326 controlling flow through the inlet 322. Outlet 324 is depicted. Flow through fuel rail 310 and flow through heat exchanger 320 exchange heat in accordance with the methods described herein.

Figure 8:
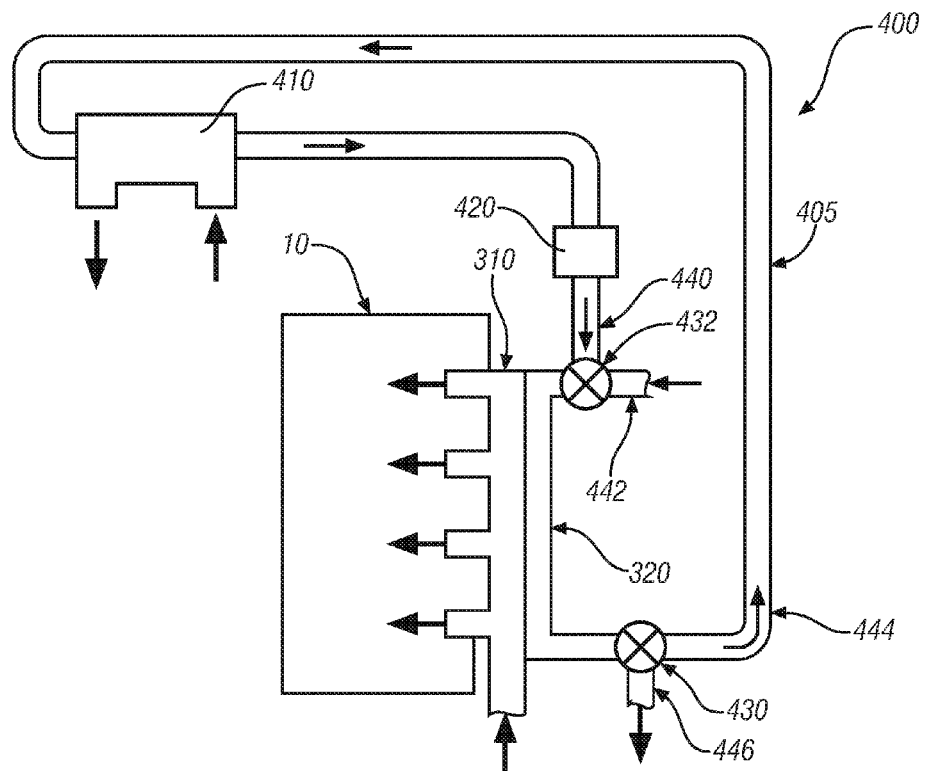
FIG. 8 depicts an exemplary engine including a fuel rail and a heat exchanger located to heat a fuel flow within the fuel rail and a three-way valve selecting between an engine coolant flow from an engine cooling circuit and a another engine coolant flow circuit utilizing a heat exchanger to transfer heat from an exhaust gas flow, in accordance with the present disclosure.

FIG. 8 depicts an exemplary engine including a fuel rail and a heat exchanger located to heat a fuel flow within the fuel rail and a three-way valve selecting between an engine coolant flow from an engine cooling circuit and a another engine coolant flow circuit utilizing a heat exchanger to transfer heat from an exhaust gas flow, in accordance with the present disclosure. Configuration 400 is depicted. Engine 10 is depicted including fuel rail 310 and heat exchanger 320. Circuit 405 is depicted including a coolant circuit that may accept heat transfer from an exhaust gas flow through heat exchanger device 410, be pumped through circuit 405 by pump 420, and flow through heat exchanger 320. Circuit 405 may be used during warm-up periods when engine coolant from the engine cooling loop is not warm enough to heat the fuel flow in accordance with the methods described herein. Input 440 and output 444 are depicted showing flow of coolant from circuit 405 through heat exchanger 405. Control through heat exchanger 320 is controlled by three-way valves 430 and 432 which may selectively open or close off input 440 and output 444. Additionally, three-way valves 430 and 432 may select flow through input 442 and output 446 connecting to the engine cooling system of engine 10. In this way, configuration 400 may provide an engine coolant flow to heat exchanger 320 and control a temperature of fuel within fuel rail 310.

FIG. 8 depicts a separate coolant circuit providing heat to the fuel delivery system, with the separate coolant circuit receiving heat from an exhaust gas heat exchanger. Similarly, a separate coolant circuit removing heat or lowering the temperature of fuel in the fuel delivery system may be operated. For example, such a separate coolant circuit may have a dedicated radiator device, and a pump may be utilized to circulate coolant through the heat exchanger located proximate to the fuel delivery system. Engine coolant with a temperature lower than the fuel may enter the heat exchanger, remove heat from the fuel, circulate to the radiator device, expel heat through the radiator device, and be recirculated to the heat exchanger.

Exhaust gas utilized in FIG. 8 may be drawn from and returned to the exhaust system from a number of locations. A pressure difference within the exhaust system may be utilized to provide flow of exhaust gas through the configuration. For example, high pressure exhaust gas may be drawn from an exhaust manifold upstream of the turbine of a turbocharger. This high pressure exhaust gas may then be returned to a low pressure region of the exhaust gas system after the turbine. In one exemplary configuration, an aftertreatment catalyst may be utilized downstream of the turbine. Flow resistance within the catalyst may create an elevated pressure, lower than the high pressure exhaust gas upstream of the turbocharger and higher than the low pressure exhaust gas, upstream of the catalyst. In one exemplary embodiment, high pressure exhaust gas may be returned to this area of elevated pressure. In another embodiment, configuration 400 may draw elevated pressure exhaust gas from the exhaust system and return the elevated pressure exhaust gas to the low pressure area of the exhaust system.

An exemplary fuel rail of an engine including a unitary heat exchanger includes an outer shell, an inlet pipe and an outlet pipe. The heat exchanger portion of the fuel rail is preferably configured with the inlet tube connected to the engine coolant supply and the outlet pipe connected to an engine coolant system return line. This configuration allows the fuel within the fuel rail to be heated to near supply engine coolant flow temperatures; approximately 85 degrees Celsius to 90 degrees Celsius for warmed-up engine operation. In an alternative embodiment, heated engine coolant may be utilized, and the fuel within the fuel rail may be heated to near the temperature of the heated engine coolant. For charged engines and for certain operating conditions, the heat exchanger portion of the fuel rail could also be configured to the intercooler supply and outlet lines using a three-way valve. With this configuration, the fuel within the fuel rail may be heated to near coolant temperatures or heated to near heated intercooler fluid flow temperatures. With a similar configuration, the fuel within the fuel rail may be heated to near coolant temperatures or cooled to near supply intercooler fluid flow temperatures. Such configurations provide the option for real-time management of the fuel temperature, where the rate at which the fuel temperature could change depends on various design parameters such as the fluid flow rate, a flow rate of fuel through the fuel rail, and the details of the fuel rail design. A number of similar exemplary embodiments are envisioned, and the disclosure is not intended to be limited to the particular exemplary embodiments described herein.

Figure 9:
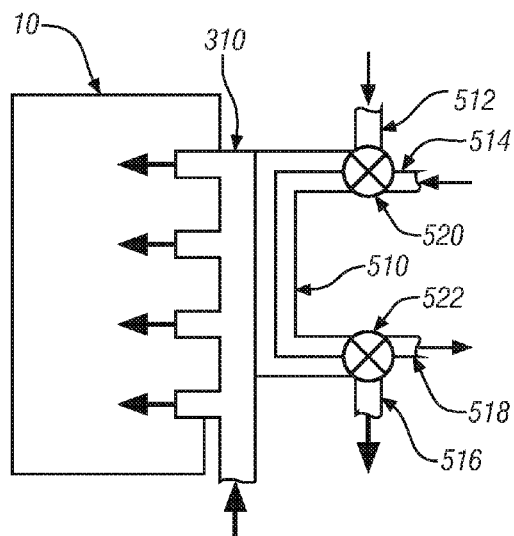
FIG. 9 depicts an exemplary engine including a fuel rail and a heat exchanger located to heat a fuel flow within the fuel rail including two flow passages for a first engine coolant flow and a second intercooler fluid flow, in accordance with the present disclosure.

FIG. 9 depicts an exemplary engine including a fuel rail and a heat exchanger located to heat a fuel flow within the fuel rail including two flow passages for a first engine coolant flow and a second intercooler fluid flow, in accordance with the present disclosure. Configuration 500 is depicted. Engine 10 is depicted including fuel rail 310 and heat exchanger 510 including two flow passages capable of exchanging heat with the fuel rail 310. Such an exemplary configuration may be used to selectably heat the fuel flow based upon either a heated intercooler fluid flow or a heated engine coolant flow. In the alternative, such a configuration may be used to selectably heat the fuel flow with one flow and selectably cool the fuel flow with a second flow. The two flows may be different flow substances, for example, one flow being engine coolant and the other being intercooler fluid, or bother flows may be the same flow substance, for example, with one flow being heated intercooler fluid and the other flow being supply intercooler fluid. In the alternative, a mass of the fluid from one or each of the flows may be contained within the heat exchanger for use during a hot soak period, as described above. Inputs 512 and 514 are depicted, and outputs 516 and 518 are depicted. Flow through heat exchanger 510 is controlled by a pair of three-way valves 520 and 522.

FIG. 9 depicts an exemplary method to combine two flows described above to control a temperature of fuel within a fuel delivery system. It will be appreciated that a number of combinations with different numbers of flows to be selected from may be implemented through a configuration similar to the exemplary configuration of FIG. 9.

The above described embodiments describe methods utilized in direct injection engines; however, it will be appreciated that the described or similar methods may be utilized in port injection engines.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to operate an internal combustion engine comprising a fuel delivery system and a heat exchanger located to affect a fuel temperature within the fuel delivery system, the method comprising:
    monitoring a desired heat transfer between a flow through the heat exchanger and fuel within the fuel delivery system;
    selecting one of a plurality of flows through the heat exchanger based upon the desired heat transfer between a flow through the heat exchanger and fuel within the fuel delivery system, the plurality of flows including a flow to heat the fuel within the fuel delivery system and a flow to cool the fuel within the fuel delivery system;
    determining a required flow rate of the selected one of the plurality of flows through the heat exchanger based upon the desired heat transfer; and
    controlling a flow control device for the heat exchanger based upon the determined required flow rate.

2. The method of claim 1, wherein the flow through the heat exchanger is an engine coolant flow heating the fuel within the fuel delivery system.

3. The method of claim 1, wherein the flow through the heat exchanger is a heated intercooler fluid flow heating the fuel within the fuel delivery system.

4. The method of claim 1, wherein the flow through the heat exchanger is a supply intercooler fluid flow cooling the fuel within the fuel delivery system.

5. The method of claim 1, wherein the flow through the heat exchanger is an exhaust gas flow heating the fuel within the fuel delivery system.

6. The method of claim 1, wherein the flow through the heat exchanger is an engine coolant flow from a coolant loop having received heat from an exhaust gas heat exchanger, the engine coolant flow heating the fuel within the fuel delivery system.

7. The method of claim 1, wherein the flow through the heat exchanger is an engine coolant flow from a coolant loop having received heat from the fuel within the fuel delivery system and expelling heat through a dedicated radiator device.

8. The method of claim 1, wherein monitoring a desired heat transfer comprises:
    measuring fuel temperature; and
    determining a feedback control of the flow rate through the heat exchanger based upon the fuel temperature.

9. The method of claim 1, wherein monitoring a desired heat transfer comprises:
monitoring operation of the engine; and
determining the desired heat transfer based upon the monitored operation of the engine; and
wherein determining a required flow rate through the heat exchanger based upon the desired heat transfer comprises:
monitoring an estimated state of the selected flow available to the heat exchanger; and
determining the required flow rate through the heat exchanger based upon the estimated state of the selected flow available to the heat exchanger and the desired heat transfer.

10. The method of claim 9, wherein monitoring the estimated state of the flow available to the heat exchanger comprises:
modeling operation of an engine cooling system.

11. The method of claim 9, wherein monitoring the estimated state of the flow available to the heat exchanger comprises:
modeling operation of an intercooler fluid circuit.

12. The method of claim 1, wherein controlling the flow control device for the heat exchanger based upon the determined required flow rate of the selected one of a plurality of flows comprises controlling a plurality of flows through the heat exchanger.

13. A method to operate an internal combustion engine comprising a fuel delivery system and a heat exchanger located to affect a fuel temperature within the fuel delivery system, the method comprising:
monitoring a desired fuel temperature;
monitoring a measured fuel temperature;
selecting one of a plurality of flows through the heat exchanger based upon the desired fuel temperature and the measured fuel temperature, the plurality of flows including a flow to heat the fuel within the fuel delivery system and a flow to cool the fuel within the fuel delivery system;
determining a required flow rate of the selected one of the plurality of flows to the heat exchanger based upon the desired fuel temperature and the measured fuel temperature; and
controlling a flow to the heat exchanger based upon the required flow.

14. The method of claim 13, wherein the desired fuel temperature is greater than the measured fuel temperature.

15. The method of claim 13, wherein controlling the flow to the heat exchanger comprises controlling a coolant flow control valve.

16. The method of claim 13, wherein the desired fuel temperature is between eighty five degrees Celsius and ninety degrees Celsius.

17. The method of claim 13, wherein monitoring the desired fuel temperature comprises:
monitoring a current combustion mode;
determining a desired fuel spray pattern based upon the current combustion mode; and
determining the desired fuel temperature based upon the desired fuel spray pattern.

18. The method of claim 17, wherein monitoring the current combustion mode comprises determining the current combustion mode to be a combustion mode sensitive to preignition; and
wherein determining the desired fuel spray pattern comprises selecting a desired spray pattern including altered penetration based upon the combustion mode sensitive to preignition.

19. The method of claim 17, wherein monitoring the current combustion mode comprises determining the current combustion mode to be a combustion mode sensitive to a condition selected from the group consisting of low combustion stability, high soot emission, and slow combustion phasing; and
wherein determining the desired fuel spray pattern comprises selecting a desired spray pattern including reduced penetration based upon the combustion mode sensitive to the condition.

20. The method of claim 13, wherein monitoring the desired fuel temperature comprises:
monitoring a required volumetric efficiency; and
determining the desired fuel temperature based upon the required volumetric efficiency.

21. An apparatus to operate an internal combustion engine comprising a fuel delivery system and a heat exchanger located to affect a fuel temperature within the fuel delivery system, the apparatus comprising:
the fuel delivery system comprising a fuel rail;
the heat exchanger located to affect the fuel temperature within the fuel rail;
at least one flow circuit connected to the heat exchanger, the at least one flow circuit comprising a flow control device;
a plurality of flows to the at least one flow circuit, the plurality of flows including a flow to heat the fuel within the fuel delivery system and a flow to cool the fuel within the fuel delivery system; and
a control module.

22. The apparatus of claim 21, wherein the flow circuit comprises a flow of intercooler fluid.

23. The apparatus of claim 21, wherein the flow circuit comprises a flow of engine coolant.

24. The apparatus of claim 21, wherein the control module:
monitors a desired fuel temperature;
monitors an actual fuel temperature;
selects one of the plurality of flows to the at least one flow circuit based upon the desired fuel temperature and the actual fuel temperature;
determines a required coolant flow rate of the selected one of the plurality of flows to the heat exchanger based upon the desired fuel temperature and the measured fuel temperature; and
controls the flow control device based upon the required coolant flow rate.

25. The apparatus of claim 21, wherein the control module:
maintains a flow from the flow circuit within the heat exchanger through a hot soak period.

* * * * *